US006465087B1

(12) United States Patent
Yamanaka et al.

(10) Patent No.: US 6,465,087 B1
(45) Date of Patent: Oct. 15, 2002

(54) THERMAL TRANSFER RECORDING SHEET

(75) Inventors: Masaaki Yamanaka, Chiba; Kazuyuki Kimura, Ibaraki, both of (JP)

(73) Assignee: Oji-Yuka Synthetic Paper Co., Ltd., Tokyo (JP)

( * ) Notice: Subject to any disclaimer, the term of this patent is extended or adjusted under 35 U.S.C. 154(b) by 0 days.

(21) Appl. No.: 09/720,805

(22) PCT Filed: Jul. 2, 1999

(86) PCT No.: PCT/JP99/03582

§ 371 (c)(1),
(2), (4) Date: Feb. 27, 2001

(87) PCT Pub. No.: WO00/01538

PCT Pub. Date: Jan. 13, 2000

(30) Foreign Application Priority Data

Jul. 3, 1998 (JP) .......................................... 10-188462

(51) Int. Cl.[7] .................................................. B32B 7/02

(52) U.S. Cl. ........................ 428/212; 427/152; 428/195; 428/403; 428/404; 428/407; 428/910

(58) Field of Search ................................ 428/195, 212, 428/403, 404, 407, 910, 913, 914; 427/152, 331

(56) References Cited

FOREIGN PATENT DOCUMENTS

| | | |
|---|---|---|
| EP | 0 351 971 | 1/1990 |
| EP | 0 855 420 | 7/1998 |
| JP | 7-32752 | 2/1995 |
| JP | 8-183263 | 7/1996 |
| JP | 9-29912 | 2/1997 |
| JP | 9-295389 | 11/1997 |
| JP | 9-295466 | 11/1997 |

*Primary Examiner*—Bruce H. Hess
(74) *Attorney, Agent, or Firm*—Oblon, Spivak, McClelland, Maier & Neustadt, P.C.

(57) ABSTRACT

A fusion thermal transfer recording sheet having a base layer (A) of a uniaxially stretched film containing 40 to 85 wt % of a thermoplastic resin and 60 to 15 wt % of an inorganic or organic fine powder; and a surface layer (B) of a uniaxially stretched film, provided on at least one surface of the base layer (A), containing 30 to 90 wt % of a thermoplastic resin and 70 to 10 wt % of an inorganic fine powder which has an average grain size equals to or smaller than that of the inorganic or organic fine powder contained in the base layer (A) and has a grain surface modified by hydrophilic treatment is disclosed. The fusion thermal transfer recording sheet is excellent in applicability to color fusion thermal transfer recording, applicability to thermal transfer bar code recording under a hot and humid atmosphere, and in ink adhesiveness.

17 Claims, 1 Drawing Sheet

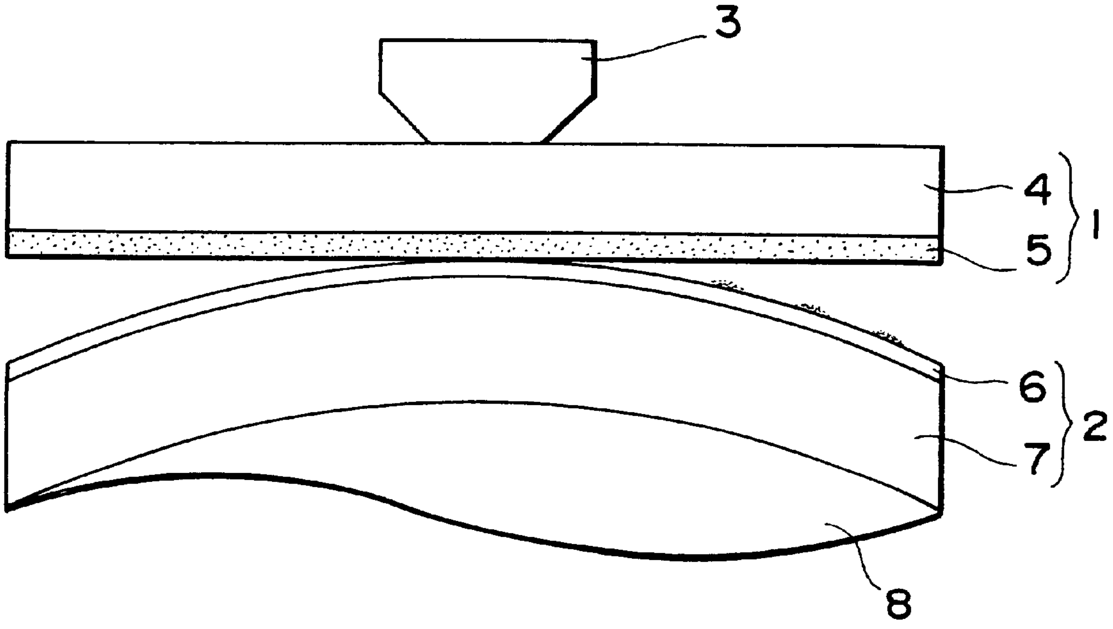
3
4
5
1
6
7
2
8

THERMAL TRANSFER RECORDING SHEET

TECHNICAL FIELD

The present invention relates to a recording sheet for use in fusion thermal transfer recording and a method for fabricating thereof. More specifically, the present invention relates to a fusion thermal transfer recording sheet excellent in bar code printing and recording properties under a hot and humid atmosphere, and can afford a sharp full-color printing with gradation, and a method for fabricating such sheet.

BACKGROUND ART

Thermal transfer recording method is roughly classified into of sublimation thermal transfer system and fusion thermal transfer system. In the sublimation thermal transfer system, a thermal transfer ink ribbon, which is composed of a color material layer and a medium supporting thereof, is heated to sublime or gasify a dye contained in the color material layer, and the sublimed or gasified dye is fixed into an image accepting recording sheet, to thereby produce a dye image. On the other hand in the fusion thermal transfer system, as shown in FIG. 1, an ink ribbon 1 composed of a thermal fusion ink layer 5 and a base 4 supporting thereof is press-contacted with a thermal transfer image accepting recording sheet 2 between a drum 8 and a heat source 3 such as a thermal head, in which the thermal fusion ink layer 5 is fused by heating through the heat source 3 as controlled with electric signals, and the fused ink is directly transferred to a thermal transfer image accepting recording sheet 2, to thereby produce an image.

In a general practice of thermal transfer recording according to the fusion thermal transfer system, a support 7 per se may be responsible for image acceptance; or polyester layer, epoxy layer or primer layer having a good adhesiveness with the ink 5, may be provided on the surface of such support 7. The fusion thermal transfer image accepting recording sheet is composed of pulp paper; opaque synthetic paper comprising a stretched film of propylene-base resin containing an inorganic fine powder; or synthetic paper composed of a transparent polyethylene terephthalate stretched film or transparent polyolefin-base resin film having thereon a pigment coating containing an inorganic fine powder and a binder to thereby enhance the whiteness and dyeing property.

It is generally understood that using a synthetic paper having therein a lot of pores is preferable to achieve a desirable strength, dimensional stability and adhesion with a printing head, when considering the post-printing properties (e.g., durability against copying, writing with a pencil, and storage) of the thermal transfer image accepting recording sheet after the thermal transfer recording, as disclosed in JP-A-60-245593 (the code "JP-A" as used herein means an "unexamined published Japanese patent application"), JP-A-61-112693, JP-A-3-216386 and JP-A-5-305780. Such synthetic papers are stretched using a tenter at a temperature lower than the H; melting points of polyolefin-base resins composing such papers to thereby form the internal pores, in order to achieve desirable opacity, softness, adhesion with the printing head and paper feed/discharge property. JP-A-8-80684 and JP-A-9-76647 disclose a synthetic paper comprising a micro-porous support containing inorganic fine powder (colloidal calcium carbonate), and having a primer-treated surface.

In recent years, full color printing is also increasingly adopted in the fusion thermal transfer recording, and need for improved gradation has shifted the main stream of a method of achieving gradation from such that forming dots of a constant diameter into a variable dot system forming individual dots with varied diameters. As for the recording sheet intended for use in full color recording using a wide range of printing energy, it is necessary that dot shape produced with the fusion thermal transfer ink is precisely reproduced (dot reproducibility), a sufficient amount of the ink can be transferred, and a high recording density is obtainable. To fulfill such requirements, there is proposed a technique in which ethylene-vinyl acetate copolymer is coated on a support made of a synthetic paper (JP-A-7-68956). Such recording sheet, however, was disadvantageous in that causing softening of the coated resin component during the thermal transfer of the ink, which excessively raised adhesive strength between the ink ribbon and the surface of the recording sheet, and undesirably resulted in blocking or omission in the printing.

Moreover, among the foregoing fusion thermal transfer image accepting recording sheets, a synthetic paper treated with a primer which comprises an aqueous solution of a nitrogen-containing polymer compound primer was suffered from a problem that the primer per se may degrade the transfer property of the fused ink since the surface of such sheet is likely to adhere (or adsorb) atmospheric moisture, which was causative of line breakage or no ink transfer during bar code printing.

On the other hand, in full-color fusion thermal transfer printing, the surface of the recording sheet should have properties differed from those in bar code printing, since inks of various colors individually having different ink components have to be transferred and overlapped. In particular to obtain a high-definition image, a precise dot reproducibility over a wide range of printing energy is required for the sheet, where the dot reproducibility of the conventional recording sheet was not always desirable enough.

It is therefore an object of the present invention to provide a fusion thermal transfer recording sheet which can solve the foregoing problem and can exhibit excellent properties both in bar code printing and full-color printing.

That is, the present invention is aimed at providing a fusion thermal transfer recording sheet causing no print omission even when printed under a hot and humid atmosphere, high in transfer density, and desirable in ink adhesiveness in bar code printing. The present invention is also aimed at providing a fusion thermal transfer recording sheet capable of producing a high-definition image in full-color printing. The present invention is further aimed at providing a simple method for fabricating a fusion thermal transfer recording sheet having such properties.

DESCRIPTION OF THE INVENTION

The present inventors found out after extensive investigations for solving the foregoing problems that the objective of the present invention is attainable by a sheet having a surface layer made of a uniaxially stretched film containing an inorganic fine powder, the surface of which being modified by hydrophilic treatment, and a base layer made of a uniaxially stretched film, which led us to propose the present invention.

That is, the present invention provides a fusion thermal transfer recording sheet having a base layer (A) of a uniaxially stretched film containing 40 to 85 wt % of a thermoplastic resin and 60 to 15 wt % of an inorganic or organic fine powder; and a surface layer (B) of a uniaxially stretched film, provided on at least one surface of the base layer (A), containing 30 to 90 wt % of a thermoplastic resin and 70 to 10 wt % of an inorganic fine powder which has an average grain size equals to or smaller than that of the inorganic or organic fine powder contained in the base layer (A) and has a grain surface modified by hydrophilic treatment.

Preferred embodiments of the present invention are such that the thermoplastic resin contained in the base layer (A) or the surface layer (B) is a polyolefin-base resin; such that the polyolefin-base resin is at least one polymer selected from the group consisting of propylene homopolymer, propylene copolymer, ethylene homopolymer and ethylene copolymer; such that the inorganic or organic fine powder contained in the base layer (A) has an average grain size of 0.6 to 3 $\mu$m, and the inorganic fine powder contained in the surface layer (B) has an average grain size of 0.4 to 1.5 $\mu$m; such that the base layer (A) or the surface layer (B) contains an inorganic fine powder selected from the group consisting of heavy calcium carbonate, clay and diatom earth; such that the surface layer (B) contains the inorganic fine powder modified by the hydrophilic treatment using an anionic polymer dispersant or a cationic polymer dispersant; such that the surface layer (B) contains heavy calcium carbonate powder modified by the hydrophilic treatment with an anionic polymer dispersant; such that the organic fine powder contained in the base layer (A) is selected from the group consisting of polyethylene terephthalate, polybutylene terephthalate, polyamide, polycarbonate, polyethylene naphthalate, polystyrene, melamine resin, polyethylene sulfite, polyimide, polyethyl ether ketone and polyphenylene sulfite; such that the organic fine powder contained in the base layer (A) has a melting point higher than that of the thermoplastic resin contained in the base layer (A) and incompatible therewith; such that a recording plane of the surface layer (B) has a smoothness of 2,000 to 10,000 seconds; such that the surface layer (B) has a pore size of 0.5 to 15 $\mu$m; such that the surface layer (B) has a surface free energy of 33 to 65 dyn/cm; such that a content of the fine powder having a grain size of 44 $\mu$m or above in the surface layer (B) is limited to 10 ppm or below; and such that a porosity of the sheet. estimated from the formula (1) described later is 5 to 60%.

The present invention also provides a method for fabricating a fusion thermal transfer recording sheet having a step for forming, on at least one side of a base layer (A) containing 40 to 85 wt % of a thermoplastic resin and 60 to 15 wt % of an inorganic or organic fine powder, a surface layer (B) containing 30 to 90 wt % of a thermoplastic resin and 70 to 10 wt % of an inorganic fine powder which has an average grain size equals to or smaller than that of the inorganic or organic fine powder contained in the base layer (A) and has a grain surface modified by hydrophilic treatment; and a step for uniaxially stretching the obtained laminate.

Preferred embodiments of the present invention are such that the uniaxial stretching is effected at a temperature lower by 5° C. or more than the melting point of the thermoplastic resin contained in the surface layer (B) and lower by 15° C. or more than the melting point of the thermoplastic resin contained in the base layer (A); and such that the uniaxial stretching is performed by 2 to 7.5 times in length.

BRIEF DESCRIPTION OF THE DRAWING

The above and other objects and features of the invention are apparent to those skilled in the art from the following referred embodiments thereof when considered in conjunction with the accompanied drawing, in which:

FIG. 1 is a schematic view explaining a fusion thermal transfer system, in which numeral 1 is a symbol for an ink ribbon, 2 for a thermal transfer image accepting recording sheet, 3 for a heat source (thermal head), 4 for a base, 5 for a thermal fusion ink, 6 for an image accepting layer, 7 for a support and 8 for a drum.

DETAILED DESCRIPTION OF THE INVENTION

Modes for carrying out the present invention will be detailed hereinafter.

The fusion thermal transfer recording sheet of the present invention has the surface layer (B) on at least one surface of the base layer (A). The base layer (A) contains a thermoplastic resin and a inorganic or organic fine powder. The surface layer (B) contains a thermoplastic resin and an inorganic fine powder.

There is no special limitation on the species of the thermoplastic resin used for the base layer (A) and surface layer (B).

Examples of such thermoplastic resin include polyolefinic resins; polyamide resins such as 6-nylon, 6,6-nylon and 6, T-nylon; thermoplastic polyester resins such as polyethylene terephthalate and its copolymer, polybutylene terephthalate and its copolymer, and aliphatic polyester; polycarbonate; atactic polystyrene; and syndyotactic polystyrene.

Among these, non-polar polyolefinic resins are preferably used. Possible examples of the polyolefinic resins include homopolymer of $C_{2-8}$ $\alpha$-olefins such as ethylene, propylene, 1-butene, 1-hexene, 1-heptene, 1-octene, 4-methyl-1-pentene and 3-methyl-1-pentene; and copolymer of 2 to 5 species selected from such $\alpha$-olefins. Either random copolymer or block copolymer is allowable. More specifically, allowable are branched or normal polyethylene having a density of 0.89 to 0.97 g/cm$^3$ and a melt flow rate (190°C., 2.16 kg load) of 1 to 10 g /10 minutes; and polymers having a melt flow rate (230° C., 2.16 kg load) of 0.2 to 10 g /10 minutes such as propylene homopolymer, propylene-ethylene copolymer, propylene-(1-butene) copolymer, propylene-ethylene- (1-butene) copolymer, propylene-(4-methyl-1-pentene) copolymer, propylene-(3-methyl-1-pentene) copolymer, poly(1-butene), poly(4-methyl-1-pentene), propylene-ethylene-(3-methyl-1-pentene) copolymer, propylene-(1-hexene) copolymer and propylene-(1-heptene) copolymer.

Among these, propylene homopolymer, propylene-ethylene random copolymer and high-density polyethylene are preferable in terms of inexpensiveness and formability. In particular, propylene-base resin is preferable for its desirable stiffness when formed into a recording sheet and low cost. The propylene-base resin is exemplified as isotactic or syndiotactic homopolymer of propylene.

Either the same thermoplastic resin or different thermoplastic resins can be used for the base layer (A) and surface layer (B). Species of the thermoplastic resins can properly be selected depending on specific properties required for the individual layers.

There is no special limitation on species of the inorganic or organic fine powder used for the base layer (A) and surface layer (B).

Examples of the inorganic fine powder include heavy calcium carbonate, precipitated calcium carbonate, fired clay, talc, titanium oxide, barium sulfate, zinc oxide, magnesium oxide, diatom earth and silicon oxide. Among these, heavy calcium carbonate, fired clay and diatomearth are preferable in terms of inexpensiveness and pore forming property during the stretching.

Examples of the organic fine powder include those made of polyethylene terephthalate, polybutylene terephthalate, polyamide, polycarbonate, polyethylene naphthalate, polystyrene, melamine resin, polyethylene sulfite, polyimide, polyethyl ether ketone and polyphenylene sulfite. Among these preferably used are those having a melting point higher than that of the thermoplastic resin employed, and is incompatible therewith.

For the base layer (A), a single species of the fine powder selected from those listed above may be used, or two or more thereof selected from the above may be used in combination. For the case that two or more thereof are used in combination, it is permissible to mix the inorganic and organic fine powders.

The inorganic fine powder for use in the surface layer (B) is not specifically limited, and those available for the base layer (A) can be used, provided that the surface of which is modified by hydrophilic treatment. The hydrophilic treatment can be effected by mixing and dispersing the inorganic fine powder together with a surfactant such as aliphatic acid metal salt using a mixer, or by wet-grinding an inorganic compound in a water-base medium under the presence of an anionic polymer dispersant or cationic polymer dispersant, and then drying the obtained powder. Heavy calcium carbonate treated with an cationic polymer dispersant is most preferable. Preferable examples of the inorganic fine powder having a surface modified by the hydrophilic treatment are disclosed in JP-A-7-300568 and JP-A-10-176079.

While blending and kneading the inorganic fine powder with an average grain size of 1.5 $\mu$m or less with the thermoplastic resin tends to generate secondary agglomerate due to poor dispersion, using the inorganic fine powder having the surface modified by the hydrophilic treatment can effectively prevent such secondary agglomerate. Thus according to the present invention, a smooth stretched film with less projections can be produced, and the ink adhesion and transfer density are improved.

Thus modified inorganic fine powder essentially for use in the surface layer (B) may also be used for the base layer (A). The modified inorganic fine powder in such case may be used as being mixed with an unmodified inorganic fine powder.

A preferable range of the average grain size of the fine powder for use in the base layer (A) is 0.6 to 3 $\mu$m. Selecting the average grain size of 0.6 $\mu$m or larger can afford a sufficient amount of pores (pores) by the stretching, and selecting that of 3 $\mu$m or smaller can control the size of the pores to a proper value to thereby prevent the film from getting corrugated.

A preferable range of the average grain size of inorganic fine powder for use in the surface layer. (B) is 0.4 to 1.5 $\mu$m. Selecting the average grain size within the above range can produce micro-cracks on the surface of the layer and can improve the ink adhesion, to thereby effectively prevent white defects from being generated during the printing. It is also preferable to limit a content of coarse grains having a diameter of 44 $\mu$m or above to as low as 10 ppm or below, since such coarse grains can form rough projections on the multi-layered resin stretched film.

When fabricating the fusion thermal transfer recording sheet of the present invention, the thermoplastic resin and the fine powder are mixed to form individual layers. The fusion thermal transfer recording sheet of the present invention can be fabricated by any combination of various methods known to those skilled in the art. Any fusion thermal transfer recording sheet obtained by any procedure will be inclusive within the scope of the present invention so far as the conditions defined in claim 1 are satisfied.

To form the base layer (A), 40 to 85 wt % of the thermoplastic resin and 60 to 15 wt % of the inorganic or organic fine powder are blended. The amount of the fine powder exceeding 60 wt % will make it difficult to produce the fusion thermal transfer recording sheet with a uniform thickness. The amount less than 15 wt % will result in insufficient pore formation by the stretching, which makes it difficult to be applied with a uniform pressure from the thermal head during the thermal transfer printing, and to obtain a high-definition image.

To form the surface layer (B), 30 to 90 wt % of the thermoplastic resin and 70 to 10 wt % of the inorganic powder having the surface of which modified by the hydrophilic treatment are blended. The amount of the inorganic fine powder exceeding 70 wt % will make it difficult to uniformly stretch the film, which tends to generate cleavages on the surface of the obtained fusion thermal transfer recording sheet, and thus ruin the practical value thereof. On the other hand, the amount less than 10 wt % will result in insufficient formation of micro-cracks and pores in the surface layer (B), which will degrade the adhesion property of the transferred ink.

It is allowable to optionally add a dispersant, antioxidant, solubilizing agent, ultraviolet stabilizer or anti-blocking agent when blending and kneading the thermoplastic resin with the fine powder.

The base layer (A) and surface layer (B) may be laminated by co-extrusion or may be laminated after separately extruded.

A preferable method for the fabrication relates to that the base layer (A) and surface layer (B) are laminated and then uniaxially stretched en bloc. Such method is more simple and less expensive as compared with the case of separate stretching and successive lamination. This method is also advantageous in that the pores formed within the base layer (A) and surface layer (B) can be controlled more simply.

A variety of known methods are applicable to the stretching. For the case using a non-crystalline thermoplastic resin, the stretching temperature can be set at a temperature equal to or higher than a glass transition point thereof; and, for the case using a crystalline thermoplastic resin, can be set within a temperature range from a glass transition point of the amorphous domain to the melting point of the crystalline domain, both ends inclusive. The stretching temperature is preferably lower by 5° C. or more than the melting point of the thermoplastic resin contained in the surface layer (B) and lower by 15° C. or more than the melting point of the thermoplastic resin contained in the base layer (A). Such temperature setting can effectively prevent the sticking of the sheet onto the surface of the roll in inter-roll stretching, and can thereby effectively prevent sticking marks from being produced on the surface of the fusion thermal transfer recording sheet. This also effectively prevent the ink adhesion from being degraded due to less formation of the micro-cracks on the surface layer (B).

Specific examples of the stretching method include inter-roll stretching based on difference in the peripheral speeds between the roll groups, and clip stretching using a tenter oven. In particular, uniaxial inter-roll stretching allows arbitrary selection of stretching times, thereby to make it possible to control the size and number of the pores formed in the layer. In particular, uniaxial stretching of all layers en bloc allows-pores and micro-cracks to be formed in a football shape, where the pores can be formed in a larger number and in a smaller size as compared with those obtained by the biaxial stretching. Since the resin in the uniaxially stretched film orients along the flow direction of the film during the stretching, the stretched film can afford the fusion thermal transfer recording sheet having a higher tensile strength and less dimensional changes due to tension during printing or other processing as compared with those of a non-stretched film.

The number of stretching times is not specifically limited and can properly be selected considering the target use of the fusion thermal transfer recording sheet and characteristics of the thermoplastic resin employed. For example for the case using a polypropylene homopolymer or a copolymer thereof, the uniaxial stretching is preferably effected in 1.2 to 10 times in length, and more preferably 2 to 7.5 times. The stretching times less than 1.2 will fail in producing micro pores desirable for the fusion thermal transfer recording sheet. On the other hand, the stretching times exceeding 10 will result in a frequent rupture of the sheet during the stretching, and also result in too large pores in the surface layer (B), which will degrade the transfer property within a low gradation portion.

After the stretching, it is also allowable to optionally perform annealing using known means such as heat rolls or hot blow oven. The stretching speed is preferably 20 to 350 m/min.

The fusion thermal transfer recording sheet of the present invention has a porous structure including a lot of micro pores, and preferably has a porosity estimated from the formula (1) below of 5 to 60%. The porosity less than 5% will degrade the ink adhesion, and will tend to degrade uniformity of the thermal head pressure during the thermal transfer printing to thereby make it difficult to obtain a high-definition image. On the other hand, the porosity exceeding 60% will tend to degrade material strength of the film, and may easily get surface destruction upon peel-off of an attached adhesive tape.

$$\frac{\rho_0 - \rho_1}{\rho_0} \times 100 \tag{1}$$

In the formula (1), $\rho_0$ denotes a true density of the fusion thermal transfer recording sheet, and $\rho_1$ denotes a density of the fusion thermal transfer recording sheet. Unless otherwise the material before the stretching contains a large volume of the air, true density nearly equals to density before the stretching. The density of the fusion thermal transfer is preferably 0.60 to 1.20 g/cm$^3$.

It is preferable that the surface layer (B) of the fusion thermal transfer recording sheet of the present invention has a pore size of 0.5 to 15 $\mu$m, and the recording plane thereof has a smoothness of 2,000 to 10,000 seconds. It is to be noted that the "pore size" in the context of this specification refers to an average value of length measured at the longest portion of the crack or pore. The term "smoothness" in a context of this specification means such value measured in accordance with JIS P-8119.

The pore size of the surface layer (B) larger than 15 $\mu$m or the smoothness of less than 2,000 seconds will degrade transfer property in low gradation portion (highlight portion), and makes it difficult to obtain a high-definition image. On the contrary, the pore size of less than 0.5 $\mu$m or the smoothness exceeding 10,000 seconds tends to cause blocking of the recording paper or degrades the running property within a printer, to thereby cause misalignment of colors in the multi-color printing and difficulty in obtaining a high-definition image.

The surface layer (B) preferably has a surface free energy of 33 to 65 dyn/cm. It is to be defined that the "surface free energy" in the context of this specification is obtained by measuring a contact angle to ion-exchanged water or methylene iodide at 23° C. and a relative humidity of 50% using a contact angle gauge (Model CA-D, product of Kyowa Kaimen Kagaku K.K.). The surface free energy of the surface layer (B) within the above range ensures obtaining a better high-definition image.

Binders contained in the ink ribbon for use with a fusion thermal transfer printer are classified into those of wax type, resin type, wax-and-resin type and the like, where free energies of the binder, which fuses during the transfer printing, and the surface of the recording sheet should be close to each other in order to ensure desirable transfer. The surface free energy less than 33 dyn/cm Ii will result in transfer of too much ink, where such excessive ink may adhere also in areas other than the target area and may produce stain. On the contrary, the surface free energy exceeding 65 dyn/cm may weaken adhesive strength between the surface of the recording sheet and the fused ink, so that in particular in multi-color printing, a first ink placed on the recording sheet may drop therefrom or the next ink may be repelled, to thereby lower the transfer density.

The thickness of the fusion thermal transfer recording material of the present invention is preferably 30 to 400 $\mu$m from the viewpoints of running properties thereof within a fusion thermal transfer printer and gradation of the obtainable image, which is more preferably 50 to 300 $\mu$m.

Ratio of the thickness of the base layer (A) and surface layer (B) is preferably 9:1 to 5:5 considering the running property of the recording sheet within a printer.

While the fusion thermal transfer recording sheet thus fabricated may be used in a form of such double-layered structure comprising the base layer (A) and surface layer (B), the sheet may further be provided on the rear plane of the base layer (A) with a thermoplastic film or natural pulp layer. It is also allowable to preliminarily provide on the surface layer (B) of the fusion thermal transfer recording sheet various prints by offset printing or the like, and then to record on the residual portion an image, character information, bar code and so forth using a fusion thermal transfer printer. It is still also allowable to provide on the back surface Tan tacky layer so as to allow the sheet to be used as a tack label.

In the paragraphs below, the present invention will further be detailed referring to Examples, Comparative Examples and Test Examples. Materials, amounts of uses, ratios and operations mentioned hereinafter can be altered without departing from the spirit of the present invention, and thus it should be understood that the scope of the present invention is by no means limited to the specific Examples shown below.

Materials used in the Examples and Comparative Examples are listed in Table 1, where "MFR" in the table denotes melt flow rate. Average grain sizes of the fine powders were measured using a grain size distribution gauge (MICROTRAC MK-II, product of Nikkiso Co., Ltd.).

TABLE 1

| Materials | Description |
|---|---|
| Polyolefin (a) | propylene homopolymer, MFR = 4.0 g/10 min (230° C., 2.16 kg load), m.p. 164° C. (DSC peak temperature) (product of Mitsubishi Chemical Corporation) |
| Polyolefin (b) | ethylene-propylene random copolymer, MFR = 10.0 g/10 min (230° C., 2.16 kg load), m.p. 137° C. (DSC peak temperature) (product of Mitsubishi Chemical Corporation |
| Polyolefin (c) | high-density polyethylene, MFR = 4.0 g/10 min (230° C., 2.16 kg load), m.p. 134° C. (DSC peak temperature) (product of Mitsubishi Chemical Corporation) |
| Polyolefin (d) | low-density polyethylene, MFR = 2.0 g/10 min (190° C., 2.16 kg load), m.p. 108° C. (product of Mitsubishi Chemical Corporation |
| Inorganic fine powder (a) | dry-ground heavy calcium carbonate, average grain size = 1.4 μm (product of Shiroishi Calcium Co., Ltd.) |
| Inorganic fine powder (b) | dry-ground heavy calcium carbonate, average grain size = 2.8 μm (product of Shiroishi Calcium Co., Ltd.) |
| Inorganic fine powder (c) | dry-ground heavy calcium carbonate, average grain size = 3.1 μm (product of Shiroishi Calcium Co., Ltd.) |
| Inorganic fine powder (d) | calcium carbonate, surface-treated with a water-base cationic surfactant during wet grinding, average grain size = 0.5 /μm (product name AFF, product of Phimatech Co., Ltd.) |
| Inorganic fine powder (e) | calcium carbonate, surface-treated with a diallylamine-base copolymer (cationic surfactant) during wet grinding, and then surface-treated with an anionic antistatic agent, average grain size = 0.8 μm (product of Phimatech Co., Ltd.) |
| Inorganic fine powder (f) | synthetic calcium carbonate (colloidal calcium carbonate), average grain size = 0.2 μm (product of Shiroishi Kogyo Co., Ltd.) |

Example and Comparative Example

The fusion thermal transfer recording sheets of the present invention (Examples 1 to 6) and comparative sheets (Comparative Examples 1 to 4) were fabricated according to the procedures described below. Types and amount of use of the materials employed, stretching conditions and stretching property were listed in Table 2.

The polyolefin-base resins and inorganic fine powders were mixed to obtain compounds [A] and [B]. The compounds [A] and [B] were separately fused and kneaded using three extruders conditioned at 250° C., the compound [B] was then placed within the die on the top surface of the compound [A], the obtained laminate was extruded, cooled to 70° C. using a cooling apparatus, to thereby obtain a double-layered non-stretched sheet. The sheet was heated to a. predetermined temperature and then longitudinally stretched by predetermined times by the inter-roll stretching. process. The stretching was not performed in Comparative Example 3. In Comparative Example 4, the inter-roll longitudinal stretching was followed by transverse stretching using a tenter oven (biaxial stretching).

Both sides of the obtained sheets were then subjected to corona treatment at 50 $W/m^2$ minute using a discharge treatment apparatus (product of Kasuga Electric Works Ltd.) to obtain double-layered fusion thermal transfer recording sheets [(B)/(A)=15 μm /70 μm].

TABLE 2

| | Polyolefin | | Inorganic fine powder | | | Stretching conditions | | |
|---|---|---|---|---|---|---|---|---|
| | type | wt % | type | grain size (μm) | wt % | temp. (° C.) | stretching times | Stretching property |
| Example 1 | | | | | | | | |
| (B) | (a) | 40 | (d) | 0.5 | 60 | 145 | 5 | good |
| (A) | (a) | 85 | (b) | 2.8 | 15 | | | |
| Example 2 | | | | | | | | |
| (B) | (b) | 70 | (e) | 0.8 | 30 | 130 | 5 | good |
| (A) | (a) | 60 | (a) | 1.4 | 40 | | | |
| Example 3 | | | | | | | | |
| (B) | (b) | 70 | (d) | 0.5 | 30 | 130 | 7.5 | good |
| (A) | (a) | 70 | (a) | 1.4 | 30 | | | |
| Example 4 | | | | | | | | |
| (B) | (c) | 35 | (d) | 0.5 | 65 | 125 | 3 | good |
| (A) | (a) | 85 | (b) | 2.8 | 15 | | | |
| Example 5 | | | | | | | | |
| (B) | (c) | 85 | (e) | 0.8 | 15 | 125 | 2 | good |
| (A) | (b) | 50 | (e) | 0.8 | 50 | | | |
| Example 6 | | | | | | | | |
| (B) | (d) | 35 | (d) | 0.5 | 65 | 120 | 5 | good |
| (A) | (c) | 85 | (b) | 2.8 | 15 | | | |
| Comparative Example 1 | | | | | | | | |
| (B) | (a) | 40 | (f) | 0.2 | 60 | 145 | 5 | good (note) |
| (A) | (a) | 85 | (c) | 3.1 | 15 | | | |
| Comparative Example 2 | | | | | | | | |
| (B) | (c) | 25 | (b) | 2.8 | 75 | 125 | 8.5 | occasional breakage |
| (A) | (b) | 50 | (f) | 0.2 | 50 | | | |
| Comparative Example 3 | | | | | | | | |
| (B) | (c) | 85 | (e) | 0.8 | 15 | no stretching | | |
| (A) | (b) | 50 | (a) | 1.4 | 50 | | | |
| Comparative Example 4 | | | | | | biaxial stretching | | |
| (B) | (c) | 85 | (e) | 0.8 | 15 | long.: 150 trans.: 160 | long.: 5 trans.: 10 | good |
| (A) | (b) | 50 | (a) | 1.4 | 50 | | | |

(note) A lot of agglomerative projections observed.

Test Examples

The obtained fusion thermal transfer recording sheet were tested and evaluated as follows.

1) Suitability to Color Fusion Thermal Transfer Recording

A color chart image expressed in three colors (cyan, magenta, yellow) was recorded on the fusion thermal transfer recording sheet at 20° C. and a relative humidity of 60% using a thermal transfer color printer (Model MD-1000, product of Alps Electric Co., Ltd.). The recorded image was observed under an optical microscope and evaluated ○: desirable reproduction of ink dots in three all colors with a sufficient transfer density over an entire gradation range;

Δ: poor reproduction of ink dots in three all colors with a slightly lower transfer density in a lower gradation range; and X:no reproduction of ink dots in three all colors with a low transfer density in low-to-middle gradation range.

2) Thermal Transfer Recording Property of Bar Code

The fusion thermal transfer recording sheet was conditioned at 35° C., a relative humidity of 90% for 24 hours in a thermostatic chamber, and a bar code and characters were then recorded thereon in the same chamber using a fusion-type ink ribbon (Resin-type B110C, product of RICOH Co., Ltd.) and a bar code printer (Model B-30-S5, product of Tokyo Denki K.K.).

The printed bar code and characters were visually observed and evaluated according to the following criteria:

○:sharp printing of the bar code and characters;

Δ: broken thin line in the bar code, which was causative of read-out error and thus undesirable in practical use; and X:broken or blurred bar code and characters, which was improper in practical use.

3) Adhesion Property of Transfer Ink

The fusion thermal transfer recording sheet having the bar code printed thereon was allowed to stand for 24 hours in a thermostatic chamber conditioned at 35° C. and a relative humidity of 90%, an adhesive tape (Cellotape®, product of Nichiban Co., Ltd.) was stuck on the surface having the bar code print and thoroughly pressed, and the adhesive tape was then peeled off at a constant velocity in a direction normal to the adhesive plane thereof. State of omission of the recording ink was visually observed and evaluated according to the following criteria:

◎: no recording ink omission observed;

○:destruction in the material portion observed but practically of no problem;

Δ: some resistance sensible when peeling off the adhesive tape, but practically undesirable due to removal of most portion of the recording ink; and X: no resistance sensible when peeling off the adhesive tape and practically not available due to removal of entire portion of the recording ink.

4) Smoothness

Smoothness of the adhesive layer was measured according to JIS P-8119.

5) Pore Size

The surface and sectional plane of the fusion thermal transfer recording sheet were photographed under an electron microscope. Ten each of cracks and pores in the surface layer (B) were randomly selected from the photographs of the surface and sectional plane, maximum lengths of the cracks and pores were measured and average values thereof were determined.

6) Surface Free Energy Contact angles of ion-exchanged water and methylene iodide on the surface layer (B) were individually measured using a contact angle gauge (Model CA-D, product of Kyowa Kaimen Kagaku K.K.) in a thermostatic chamber conditioned at 23° C. and a relative humidity of 50%, and surface free energy was estimated.

Results of the individual tests were summarized in Table 3.

TABLE 3

| | Suitability to fusion thermal transfer recording | Thermal transfer recording property of bar code | Ink adhesiveness | Smoothness (sec) | Pore size (μm) | Surface free energy (dyn/cm) |
|---|---|---|---|---|---|---|
| Example 1 | ○ | ○ | ○ | 8,500 | 2.4 | 63 |
| Example 2 | ○ | ○ | ○ | 8,000 | 3.8 | 45 |
| Example 3 | ○ | ○ | ○ | 9,500 | 3.5 | 58 |
| Example 4 | ○ | ○ | ○ | 3,300 | 1.2 | 53 |
| Example 5 | ○ | ○ | ◎ | 2,500 | 1.4 | 35 |
| Example 6 | ○ | ○ | ○ | 6,000 | 2.2 | 60 |
| Comparative Example 1 | x | x | Δ | 100 | 16(note) | 31 |
| Comparative Example 2 | Δ | Δ | Δ | 12,000 | 22 | 32 |
| Comparative Example 3 | Δ | Δ | ○ | 500 | no pore | 33 |
| Comparative Example 4 | Δ | Δ | x | 15,000 | 8 × 4 disc | 32 |

(note)coarse pores observed

As is clear from Table 3, the fusion thermal transfer recording sheets of the present invention have surface free energy, smoothness and pore size of the surface layer (B) within preferable ranges, and can give desirable results in all of color fusion thermal transfer property, thermal transfer recording property of bar code under hot and humid atmosphere and recording ink adhesion (Example 1 to 6).

On the contrary, all of the fusion thermal transfer recording sheets having the surface layer (B) containing the inorganic fine powder not subjected to the hydrophilic treatment (Comparative Examples 1 and 2), unstretched fusion thermal transfer recording sheet (Comparative Example 3), and biaxially stretched fusion thermal transfer recording sheet (Comparative Example 4) failed in obtaining good results and were found to be impractical.

Industrial Applicability

The fusion thermal transfer recording sheet of the present invention is excellent in color fusion thermal transfer property, thermal transfer recording property of bar code under hot and humid atmosphere, and recording ink adhesion. Thus the fusion thermal transfer recording sheet of the present invention is applicable to various printers differ in the recording system, which ensures versatility and excellent industrial applicability thereof. According to the method of the present invention, such fusion thermal transfer recording sheet can be fabricated in a simple manner.

The present application claims priority to PCT/JP99/03582 filed Jul. 2, 1999 which is herein incorporated by reference.

What is claimed is:

1. A fusion thermal transfer image accepting recording sheet comprising:

a) a base layer (A) of a uniaxially stretched film containing 40 to 85 wt % of a thermoplastic resin and 60 to 15 wt % of an inorganic or organic fine powder; and b) a surface layer (B) of a uniaxially stretched film, provided on at least one surface of the base layer (A), containing 30 to 90 wt % of a thermoplastic resin and 70 to 10 wt % of an inorganic fine powder which has an average grain size equal to or smaller than that of the inorganic or organic fine powder contained in the base layer (A) and has a grain surface modified by hydrophilic treatment.

2. The fusion thermal transfer image accepting recording sheet as claimed in claim 1, wherein the thermoplastic resin contained in the base layer (A) or the surface layer (B) is a polyolefin-base resin.

3. The fission thermal transfer image accepting recording sheet as claimed in claim 2, wherein the polyolefin-base resin is at least one polymer selected from the group consisting of propylene homopolymer, propylene copolymer, ethylene homopolymer and ethylene copolymer.

4. The fusion thermal transfer image accepting recording sheet as claimed in claim 1, wherein the inorganic or organic fine powder contained in the base layer (A) has an average grain size of 0.6 to 3 μm, and the inorganic fine powder contained in the surface layer (B) has an average grain size of 0.4 to 1.5 μm.

5. The fusion thermal transfer image accepting recording sheet as claimed in claim 1, wherein the base layer (A) or the surface layer (B) contains an inorganic fine powder selected from the group consisting of heavy calcium carbonate, clay and diatom earth.

6. The fusion thermal transfer image accepting recording sheet as claimed in claim 1, wherein the surface layer (B) contains the inorganic fine powder modified by the hydrophilic treatment using an anionic polymer dispersant or a cationic polymer dispersant.

7. The fusion thermal transfer image accepting recording sheet as claimed in claim 6, wherein the surface layer (B) contains heavy calcium carbonate powder modified by the hydrophilic treatment with an anionic polymer dispersant.

8. The fusion thermal transfer image accepting recording sheet as claimed in claim 1, wherein the organic fine powder contained in the base layer (A) is selected from the group consisting of polyethylene terephthalate, polybutylene terephthalate, polyamide, polycarbonate, polyethylene naphthalate, polystyrene, melamine resin, polyethylene sulfite, polyimide, polyethyl ether ketone and polyphenylene sulfite.

9. The fusion thermal transfer image accepting recording sheet as claimed in claim 1, wherein the organic fine powder contained in the base layer (A) has a melting point higher than that of the thermoplastic resin contained in the base layer (A) and is incompatible therewith.

10. The fusion thermal transfer image accepting recording sheet as claimed in claim 1, wherein a recording plane of the surface layer (B) has a smoothness of 2,000 to 10,000 seconds.

11. The fusion thermal transfer image accepting recording sheet as claimed in claim 1, wherein the surface layer (B) has a pore size of 0.5 to 15 μm.

12. The fusion thermal transfer image accepting recording sheet as claimed in claim 1, wherein the surface layer (B) has a surface free energy of 33 to 65 dyn/cm.

13. The fusion thermal transfer image accepting recording sheet as claimed in claim 1, wherein a content of the fine powder having a grain size of 44 μm or above in the surface layer (B) is limited to not more than 10 ppm.

14. The fusion thermal transfer image accepting recording sheet as claimed in clam 1, wherein a porosity of the sheet estimated from the formula (1) below is 5 to 60%:

$$\frac{\rho_0 - \rho_1}{\rho_0} \times 100 \qquad (1)$$

wherein $\rho_0$ denotes a true density of the fusion thermal transfer recording sheet, and wherein $\rho_1$ denotes a density of the fusion thermal transfer image accepting recording sheet.

15. A method for fabricating a fusion thermal transfer image accepting image accepting recording sheet comprising the steps of:

a) forming, on at least one side of a base layer (A) containing 40 to 85 wt % of a thermoplastic resin and 60 to 15 wt % of an inorganic or organic fine powder, a surface layer (B) containing 30 to 90 wt % of a thermoplastic resin and 70 to 10 wt % of an inorganic fine powder which has an average grain size equal to or smaller than that of the inorganic or organic fine powder contained in the base layer (A) and has a grain surface modified by hydrophilic treatment; and b) uniaxially stretching the obtained laminate.

16. The method for fabricating a fusion thermal transfer image accepting recording sheet as claimed in claim 15, wherein the uniaxial stretching is effected at a temperature at least 5° C. lower the n the melting point of the thermoplastic resin contained in the surface layer (B) and at a temperature of at least 15° C. lower than the melting point of the thermoplastic resin contained in base layer (A).

17. The method for fabricating a fusion thermal transfer image accepting recording sheet as claimed in claim 15, wherein the uniaxial stretching increases in length 2 to 7.5 times.

* * * * *